United States Patent
Arai et al.

(10) Patent No.: US 8,040,410 B2
(45) Date of Patent: Oct. 18, 2011

(54) IMAGING APPARATUS

(75) Inventors: Yuko Arai, Yokohama (JP); Haruhiko Miyao, Mito (JP); Tsutomu Usui, Yokohama (JP); Haruhiko Higuchi, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 359 days.

(21) Appl. No.: 12/430,144

(22) Filed: Apr. 27, 2009

(65) Prior Publication Data

US 2010/0002093 A1    Jan. 7, 2010

(30) Foreign Application Priority Data

Jul. 4, 2008    (JP) .................. 2008-175202

(51) Int. Cl.
    *H04N 5/202*    (2006.01)
    *H04N 5/238*    (2006.01)
    *G03B 7/00*    (2006.01)
    *G03F 3/08*    (2006.01)

(52) U.S. Cl. ........ 348/254; 348/365; 348/366; 358/519; 396/213

(58) Field of Classification Search ............... 348/222.1, 348/229.1, 230.1, 234, 254, 255, 362–366; 358/518–520; 396/63–70, 155–166, 213–262
See application file for complete search history.

(56) References Cited

FOREIGN PATENT DOCUMENTS

JP    2007-180892    7/2007

*Primary Examiner* — Sinh Tran
*Assistant Examiner* — Mark Monk
(74) *Attorney, Agent, or Firm* — Antonelli, Terry, Stout & Kraus, LLP.

(57) ABSTRACT

A camera capable of compensating for facial field of a person to a proper brightness, and maintaining the luminance scale of the background, comprising an imaging portion for generating the picture data of the person; a gamma compensator for performing gamma compensation for the picture data; a facial field detecting portion for detecting a facial field from the picture data; a photometric portion for exposure metering value of the facial field detected by the facial field detecting portion; an exposure controlling portion for calculating a target exposure amount in response to the output of the photometric portion and controlling exposure depending on the target exposure amount; and a gamma compensation controlling portion for determining a luminance scale characteristic in accordance with the target exposure amount, wherein the gamma compensating portion is controlled on the basis of the luminance scale characteristic determined by the gamma compensation controlling portion.

7 Claims, 5 Drawing Sheets

TARGET EXPOSURE AMOUNT VS. RESULT OF EXPOSURE METERING VALUE $c1, c2$ : CRITERION VALUES FOR TARGET EXPOSURE

FIG.4

EXPOSURE CONTROL VALUE VS. TARGET EXPOSURE AMOUNT $r1$ : MAXIMUM EXPOSURE CONTROL VALUE
$r2$ : MINIMUM EXPOSURE CONTROL VALUE

FIG.5

GAMMA COEFFICIENT G VS. TARGET EXPOSURE AMOUNT I

FIG.6

CHANGE IN LUMINANCE SCALE CHARACTERISTIC WITH INCREASE IN GAMMA COEFFICIENT

IMAGING APPARATUS

INCORPORATION BY REFERENCE

The present application claims priority from Japanese application JP2008-175202 filed on Jul. 4, 2008, the content of which is hereby incorporated by reference into this application.

FIELD OF THE INVENTION

This invention relates to an imaging apparatus.

BACKGROUND OF THE INVENTION

JP-A-2007-180892, known as one of the related prior art techniques, discloses a camera comprising a face detecting circuit, a gamma compensation controller and a picture signal processing circuit, wherein the face detecting circuit detects a face from an inputted picture signal and calculates a brightness change estimation value for the facial area including the detected face; the gamma compensation controller determines a luminance scale characteristic on the basis of the brightness change estimation value calculated by the face detecting circuit; and the picture signal processing circuit performs gamma compensation for the inputted picture signal on the basis of the luminance scale characteristic determined by the gamma compensation controller.

With the popularization of digital cameras capable of taking motion pictures as well as still pictures, it has come to be possible for every body to take good pictures. People are the most favorite objects that are most often photographed. Therefore, such cameras are increasing on the market as are equipped with face recognition and optimization functions which automatically recognize the face of a person and optimizes the camera setting according to the recognized face.

Such a face recognizing function as equipped in the cameras mentioned above, compares the inputted picture signal with the pattern stored previously in the memory in the camera, and detects the area in the imaging surface in the camera on which the face is focused (this area is hereafter referred to as "facial field"). Data gathered from within the detected facial field include the position of the facial field, exposure metering value, color, etc. When the detected facial field is actually photographed, proper procedures is automatically performed on the basis of the gathered data. The proper procedures meant here includes, for example, providing proper brightness on the facial field, focusing of the facial field preferentially, controlling white balance such that the facial field is properly colored, and adjusting the chrominance signal such that natural skin color can be displayed.

The automatic compensation of brightness in the facial field to maintain it at a proper level of brightness, which was enumerated above as the first of the proper procedures mentioned above, is strongly required by users. When a person is photographed, it often happens that the picture is taken against the sun, that is, the difference in brightness between the object and the background is very large. In such a case, the brightness of the object, i.e. person, cannot usually be maintained at a proper level since the brightness of the background adversely affects that of the object. It might be possible in this case to properly adjust the brightness of the object manually, but such manual compensation is awkward and especially difficult for ordinary users to do.

There is known a conventional technique for automatically compensating for the brightness of the facial field such that it is maintained at a proper level of brightness. According to the conventional technique, exposure control value (for proper control of iris, shutter and AGC, i.e. automatic gain control, circuit) is varied in accordance with the target exposure amount calculated on the basis of the exposure metering value in the facial field. However, since the exposure control value is that which controls the brightness of the entire imaged picture, the brightness of the facial field can indeed be maintained at a proper level, but the brightness of the background becomes improper so that overexposure or underexposure may occur in the background.

There is also known a conventional technique for automatically compensating for the brightness of the facial field to maintain it at a proper level of brightness, and preventing such overexposure and underexposure. According to this technique, gamma compensation control is varied in accordance with the target exposure amount calculated on the basis of the exposure metering value in the facial field. The gamma compensation control is to change the luminance scale characteristic of an imaged picture. And by properly controlling the gamma compensation, the brightness of the facial field and the luminance scale of the background can be made compatible with each other.

A technique for changing the luminance scale characteristic through the control of gamma compensation in accordance with the data collected in the facial field by the face recognition function, is disclosed in, for example, in the above mentioned JP-A-2007-180892. According to JP-A-2007-180892, even if there is difference in brightness within the facial field, proper brightness can be reproduced by calculating the difference in brightness within the facial field and then by using the luminance scale characteristic in accordance with the calculated brightness difference. According to this method, however, only the difference in brightness within the facial field is regarded as the criterion for gamma compensation, the reproducibility of the luminance scale of the background brightness is not so much taken into consideration.

As described in the foregoing, in order to make compatible the brightness of the face of a person and the luminance scale of the background in photographing the person, it is necessary to properly control exposure and gamma compensation on the basis of the data collected within the facial field and to select such exposure control value and luminance scale characteristic as correspond to a picture to be imaged.

Conventional face recognition and optimization function has not taken it into consideration to reproduce the luminance scale of the background brightness since only difference in brightness within the facial field is regarded as the criterion for gamma compensation.

SUMMARY OF THE INVENTION

An object of this invention is to provide an imaging apparatus capable of reproducing pictures of high quality, and especially an imaging apparatus which can compensate for the brightness of the facial field such that it is maintained at a proper level of brightness and preserve the luminance scale of the background at the same time.

In order to attain this object, the imaging apparatus according to the present invention employs such configurations as recited in the appended claims.

According to this invention, it is possible to provided an imaging apparatus capable of reproducing pictures of high quality. With an imaging apparatus according to this invention, the luminance scale characteristic of the background can be maintained while properly compensating for the brightness of the facial field is properly compensated for, by properly choosing the exposure control value and the luminance scale characteristic. Further, with an imaging apparatus according to this invention, since luminance scale characteristic can be changed according to the size of facial field, it is possible to provide a camera which can maintain the optimal luminance scale characteristic depending on images to be photographed.

Above described and other configurations and advantages will be apparent when one reads the flowing description of the embodiment of this invention in reference to the attached drawings.

Other objects, features and advantages of the invention will become apparent from the following description of the embodiments of the invention taken in conjunction with the accompanying drawings.

DETAILED DESCRIPTION OF THE EMBIDIMENT

This invention will be described below by way of embodiment in reference to the attached drawings.

Embodiment 1

Figure 1:
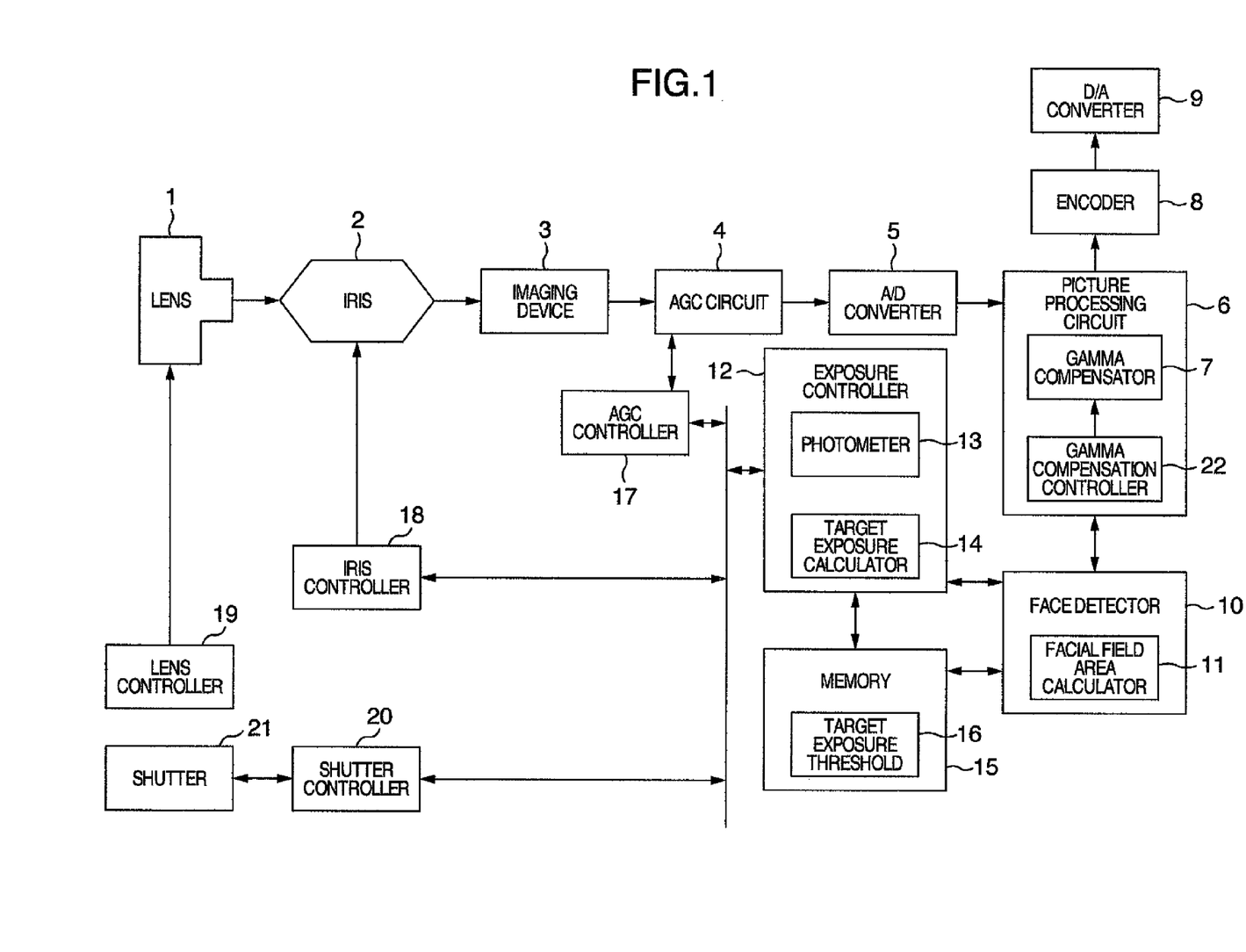
FIG. 1 shows in block diagram an imaging apparatus as an embodiment of this invention.

FIG. 1 shows in block diagram an imaging apparatus, e.g. camera, as an embodiment of this invention. The imaging apparatus or camera comprises a camera lens 1, an iris 2, an imaging device 3, an AGC (automatic gain control) circuit 4, an A/D converter 5, a picture processing circuit 6, a gamma compensator 7, a gamma compensation controller 22, an encoder 8, a D/A converter 9, a face detector 10, a facial field area calculator 11 (here "area" means "superficial content"), an exposure controller 12, a photometer 13, a target exposure calculator 14, a memory 15, a target exposure threshold 16, an AGC controller 17, an iris controller 18, a lens controller 19, a shutter controller 20, and a shutter 21.

As shown in FIG. 1, the shutter controller 20 controls the shutter 21 when the shutter button of the camera is depressed. The camera lens 1, consisting mainly of a focus lens and a zoom lens, is controlled by the lens controller 19. The iris 2 is controlled by the iris controller 18 to control the impinging light through the camera lens 1. The imaging device 3, which is, for example, a CMOS imaging sensor, outputs an image signal of analog format (i.e. analog image signal) after the photoelectric conversion of an imaged object focused on the imaging plane by means of the camera lens 1. The AGC circuit 4, controlled by the AGC controller 17, amplifies the analog image signal so that the analog image signal may have a predetermined signal level. The A/D converter 5 converts the analog image signal, which has been amplified by the AGC circuit 4, to an image signal of digital format (i.e. digital image signal). The picture processing circuit 6, consisting mainly of the gamma compensator 7 and the gamma compensation controller 22, generates a digital luminance signal and a digital chrominance signal from the digital image signal, which is outputted from the A/D converter 5, and performs various signal processings such as gamma compensation processing, edge enhance processing, noise reduction processing and white balance processing. The encoder 8 generates a digital television signal in compliance with the standard television system such as the NTSC system, from the digital luminance signal and the digital chrominance signal outputted from the picture processing circuit 6. The digital television signal is recorded in or reproduced from such recording media as, for example, an optical disk (e.g. blu-ray disc (BD) or DVD), a hard disk (HDD) or a semiconductor memory (internally installed/detachable) by means of a recording/reproducing circuit (not shown). The D/A converter 9 converts the digital television signal to a standardized television signal of analog format.

The face detector 10 detects the facial field contained in the picture signal outputted from the imaging device 3, according to such a procedure as described below. To begin with, the face detector 10 extracts an area having skin color out of the picture signal inputted to the picture processing circuit 6. Then, the face detector 10 performs contour extraction with respect to the extracted area in accordance with change in brightness, and checks if there are two eyes and a mouth in the positions where human eyes and mouth normally exist. If two eyes and a mouth exist, a rectangular area enclosing the extracted area is specified and detected as a "facial field". The facial field area calculator 11 calculates the ratio of the area or superficial content of the facial field to the superficial content of the entire imaging surface, as follows. Let the number of the effective pixels in the imaging device 3 at the time of photographing be equal to d1, and the number of such pixels as is occupied by the facial field be equal to d2. Then, the area, i.e. superficial content, S of the facial field is given by S=d2/d1. If plural facial fields are detected, the total sum of the numbers of the pixels covered by the respective facial fields is defined as the number d2 of pixels covered by the resultant facial field.

The exposure controller 12 consists mainly of the photometer 13 and the target exposure calculator 14; calculates a target exposure amount in accordance with the result of measurement by the photometer 13 of that part of the picture signal corresponding to the facial field; determines an exposure control value corresponding to the target exposure amount; and controls the AGC controller 17, the iris controller 18 and the shutter controller 20 such that the digital image signal inputted to the picture processing circuit 6 becomes equal to the exposure control value.

Figure 3:
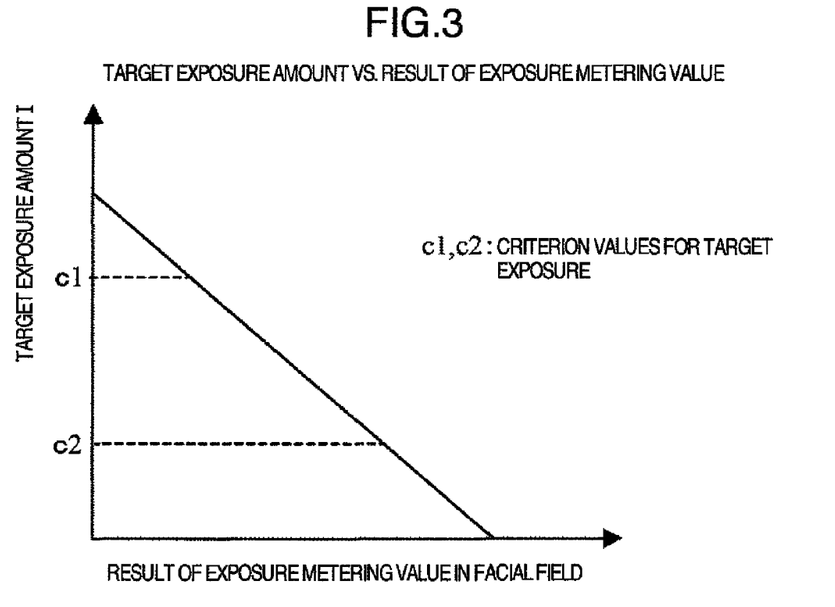
FIG. 3 shows in graphical representation the relationship between target exposure amount and the result of exposure metering value in the facial field, associated with the embodiment of this invention.

FIG. 3 shows in graphical representation the relationship between target exposure amount and the result of exposure metering value in the facial field, associated with the embodiment of this invention. Criterion values c1 and c2 for target exposure are introduced for the target exposure value I. The details about these items will be described later in detail.

Figure 4:
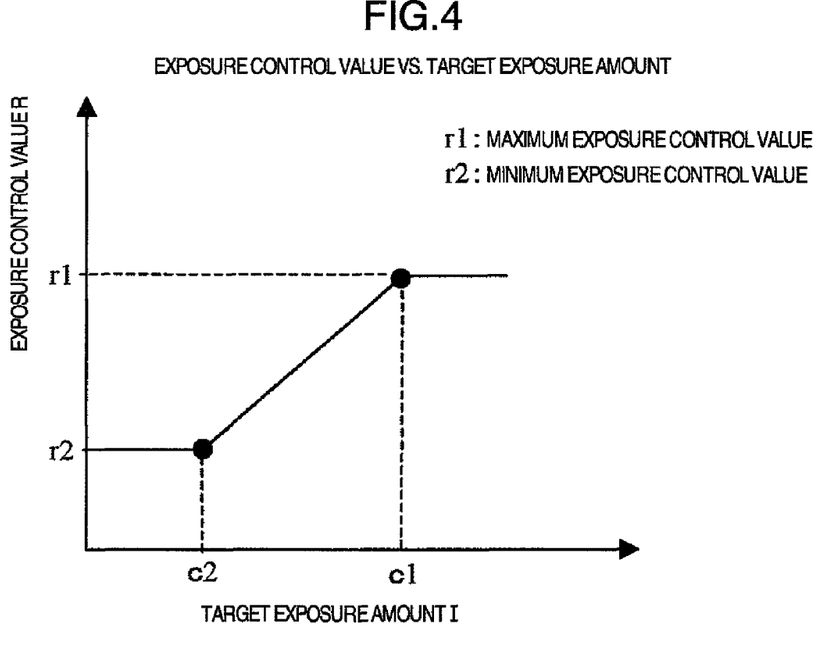
FIG. 4 shows in graphical representation the relationship between exposure control value and target exposure amount, associated with the embodiment of this invention.

FIG. 4 shows in graphical representation the relationship between exposure control value R and target exposure amount I, associated with the embodiment of this invention. When the target exposure amount is greater than the criterion value c2 and smaller than the criterion value c1, the exposure control value R varies dynamically in accordance with the target exposure amount I. When the target exposure amount I is equal to or greater than c1, the exposure control value R is fixed to the maximum exposure control value r1 while when the target exposure amount I is equal to or smaller than c2, the exposure control value R is fixed to the minimum exposure control value r2.

Figure 5:
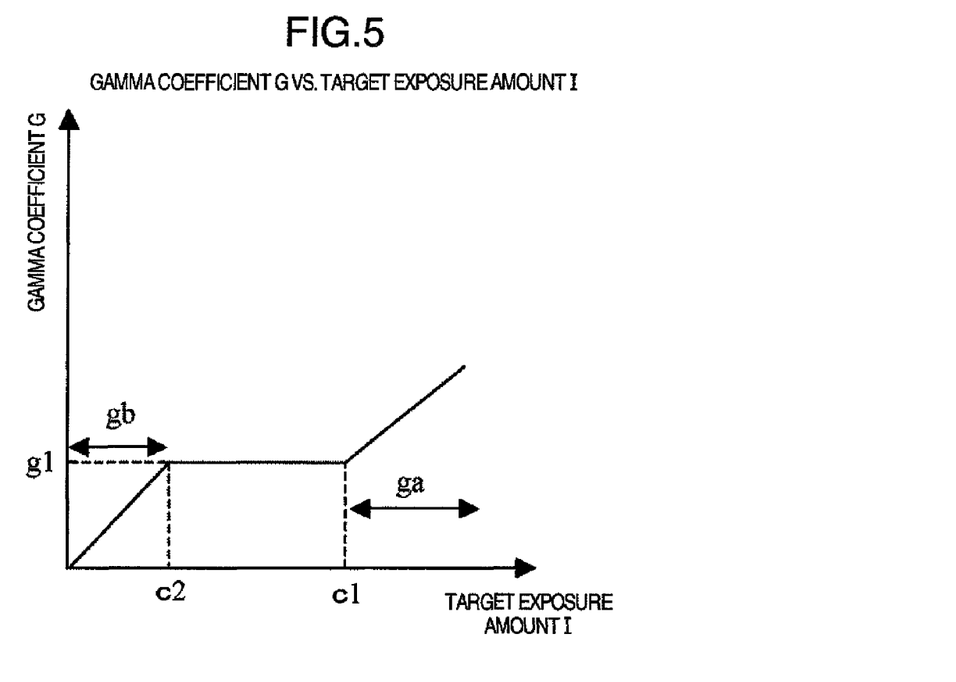
FIG. 5 shows in graphical representation the relationship between gamma coefficient G and target exposure amount I, associated with the embodiment of this invention.

FIG. 5 shows in graphical representation the relationship between gamma coefficient G and target exposure amount I, to be used for determining luminance scale characteristics in relation to target exposure amount, associated with the embodiment of this invention. According to this invention, in order to relate a target exposure amount I to a luminance scale characteristic, a gamma coefficient G corresponding to a target exposure amount I is first calculated, and then the associated luminance scale characteristic is determined depending on the calculated gamma coefficient G. For example, if the target exposure amount I is greater than c2 and smaller than c1, the gamma coefficient G is fixed to the value g1 which is equal to the value corresponding to the case where the face detector 10 does not detect any facial field (this case is hereafter referred to as "normal case"). If the target exposure amount I is equal to or greater than c1, or equal to or smaller than c2, then the gamma coefficient G is dynamically varied depending on the target exposure amount I and the area of the facial field.

Figure 6:
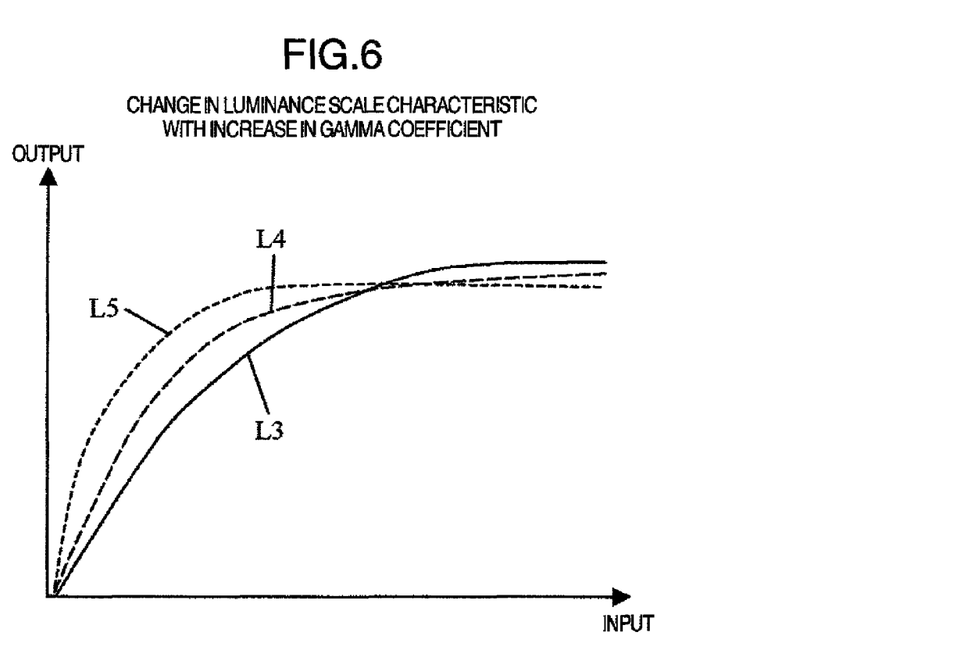
FIG. 6 shows in graphical representation the change in luminance scale characteristic with the increase in gamma coefficient, associated with the embodiment of this invention.
Figure 7:
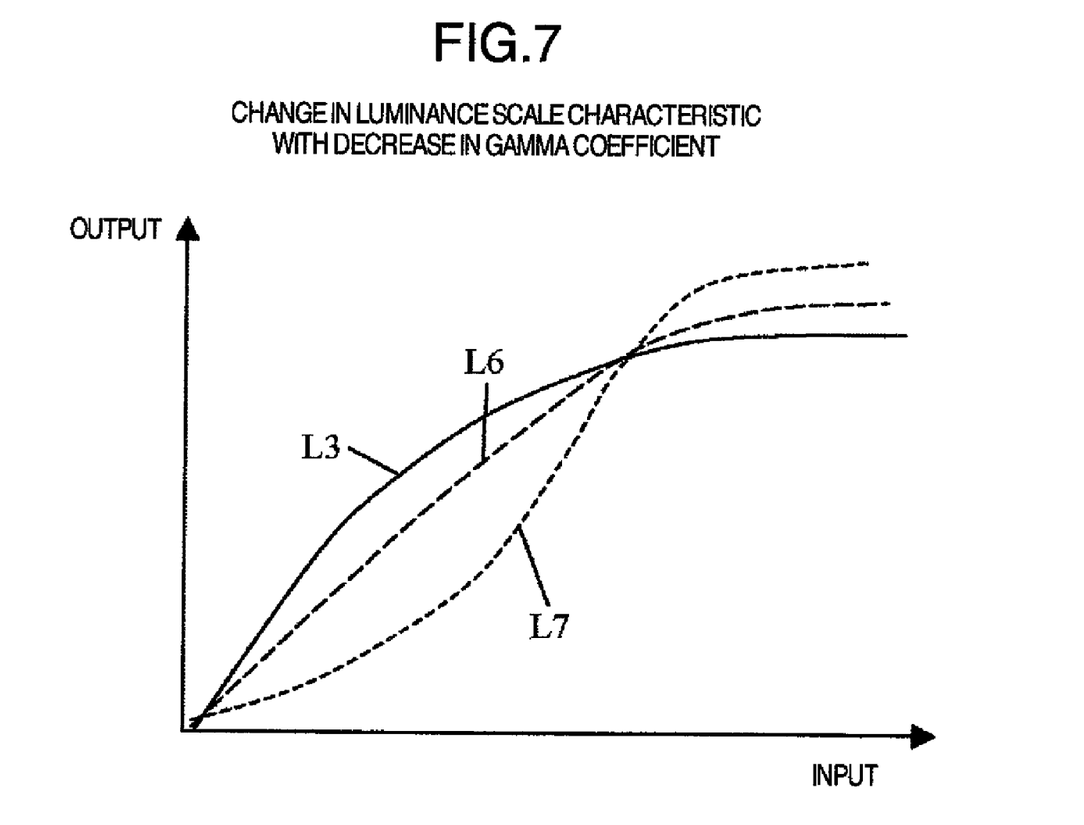
FIG. 7 shows in graphical representation the change in luminance scale characteristic with the decrease in gamma coefficient, associated with the embodiment of this invention.

FIGS. 6 and 7 show in graphical representation examples of the relationship between gamma coefficient G and luminance scale characteristic. FIG. 6 corresponds to the case where the gamma coefficient G is greater than the value g1 of the normal case (corresponding to the region ga in FIG. 5). As the gamma coefficient G increases, the luminance scale characteristic is varied in such a manner that intermediate luminance scales are expanded as indicated by curves L3, L4, L5, . . . . FIG. 7 corresponds to the case where the gamma coefficient G is smaller than the value g1 of the normal case (corresponding to the region gb in FIG. 5). As the gamma coefficient G decreases, the luminance scale characteristic is varied in such a manner that intermediate luminance scales are narrowed as indicated by curves L3, L6, L7, . . . .

The operation of the embodiment of this invention will now be described below. The image of an object is focused on the imaging surface (plane) of the imaging device 3 through the camera lens 1. The imaging device 3 generates an analog image signal through the photoelectric conversion of the focused optical signal corresponding to the brightness of the focused image into the corresponding electric signal. This analog image signal, after having been amplified up to a desired signal level by the AGC circuit 4, is converted to the corresponding digital image signal by the A/D converter 5. The digital image signal is fed to the picture processing circuit 6.

Figure 2:
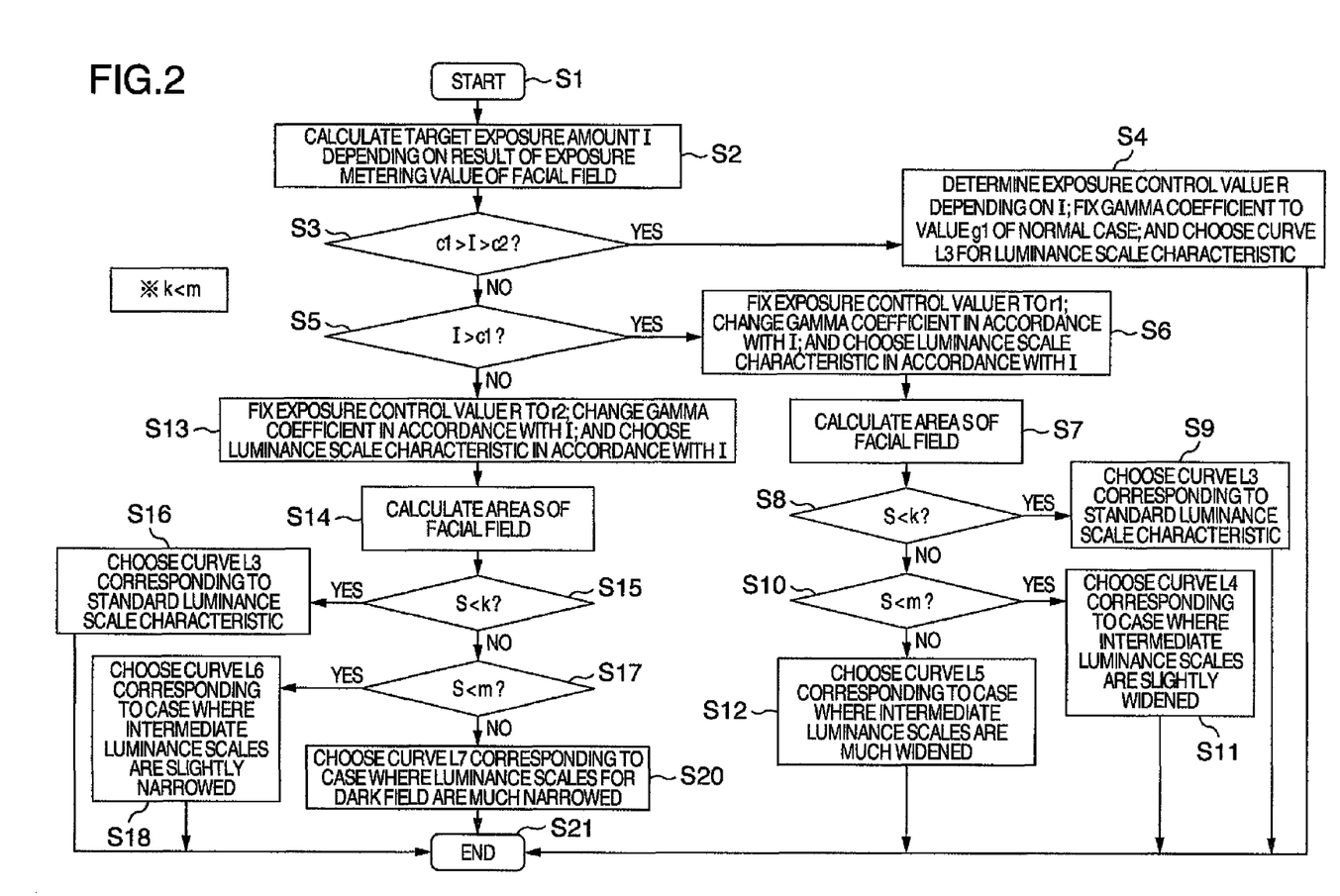
FIG. 2 is a flow chart of the procedures for properly compensating for the brightness of the facial field without destroying the luminance scale characteristic of the background.

When the face detector 10 detects a facial field in the digital image signal received by the picture processing circuit 6, the face detector 10 performs processing shown in FIG. 2 such that the detected facial field is given a proper luminance. To begin with, the photometer 13 equipped in the exposure controller 12 measures the luminance of the image signal representing the facial field detected by the face detector 10, and then the corresponding target exposure amount I is calculated by the target exposure calculator 14 on the basis of the exposure metering value (S2). For the relationship between the exposure metering value and the target exposure amount I, the relationship shown in FIG. 3 may be used.

When the target exposure amount I is smaller than the criterion value c1 for target exposure and greater than the criterion value c2 for target exposure (S3), the exposure controller 12 calculates an exposure control value R on the basis of the target exposure amount I, and controls the iris controller 18, the shutter controller 20 and the AGC controller 17 on the basis of the exposure control value R. The gamma compensation controller 22 sets the gamma coefficient of g1 in the gamma compensator 7. The gamma coefficient g1 is the value equal to that for the normal case and a fixed value as shown in FIG. 5. By using this gamma coefficient g1, the gamma controller 7 performs such processing as compensation of gamma for the digital image signal (S4). This processing is applicable only to a case where the degree of compensation of the luminance in the facial field can be small. In this case, it is highly probable that even if the luminance of the entire field of the imaged picture is uniformly changed in accordance with the exposure control value, the luminance scale of the background is not smeared. For this reason, gamma compensation control may be the same as that performed in the normal case. Thus, by using the gamma compensation for the normal case and through the compensation of luminance with the exposure control value R alone, the luminance of the facial field can be optimally determined while the luminance scale of the background is properly adjusted.

When the target exposure amount I is greater than the criterion value c1 for target exposure (S5), the exposure controller 12 causes the exposure control value R to be fixed to the maximum exposure control value r1, and sets the fixed, maximum exposure control value r1, into the iris controller 18, the shutter controller 20 and the AGC controller 17. The gamma compensation controller 22 specifies such luminance scale characteristic as corresponding to the target exposure amount I and the area of the facial field, and the gamma controller 7 compensates for the gamma coefficient of the digital image signal depending on the specified luminance scale characteristic (S6). This compensation corresponds to, for example, a case where a person as an object is photographed against the glaring sun so that the luminance of the facial field must be greatly enhanced in compensation. In such a case, if compensation is performed by using the exposure control value R alone, overexposure may occur in the background. Therefore, the exposure control value R is fixed to the value (i.e. maximum exposure control value r1) that prevents the background from being overexposure. And by varying the luminance scale characteristic through the control of gamma compensation, the compensation of luminance, that is insufficient with exposure control alone, can be satisfactorily performed. In this way, the luminance scale of the background can be maintained while the luminance of the facial field is kept at a proper level.

A more proper luminance scale characteristic can be set if control in accordance with the area of the facial field is simultaneously performed at the time of setting luminance scale characteristic, as described below.

When the area S of the facial field is smaller than a predetermined threshold k (S8), the gamma compensation controller 22 specifies a luminance scale characteristic as represented by the curve L3 which approximates the luminance scale characteristic of the normal case (S9). This corresponds to a case where a person is photographed against the sun and the background occupies a large area in the imaged field, relative to the person as an object. In such a case, it is considered that the photographer usually prioritize the luminance scale of the background over that of the person, but if a luminance scale characteristic adapted to the facial field is used, the background may be overexposure. In order to prevent such overexposure, the luminance scale characteristic approximating that used in the normal case is used.

When the area S of the facial field is larger than the threshold k but smaller than another predetermined threshold m (S10), the gamma compensation controller 22 specifies the luminance scale characteristic represented by the curve L4 which indicates that intermediate scales are slightly expanded (S11). This corresponds to a case where a person is photographed against the sun and the background occupies half the area of the entire imaged field, relative to the person. In this case, it is desired to preserve the luminance scales of both the person and the background. Hence, a luminance scale characteristic corresponding to the case where the luminance of the facial field is more enhanced than in the previous cases, must be used to produce the facial field with higher luminance. However, the luminance scale of the facial field should not be so much enhanced that the background may be overexposure.

When the area S of the facial field is larger than the threshold m (S10), the gamma compensation controller 22 specifies the luminance scale characteristic represented by the curve L5 which indicates that intermediate scales are largely expanded (S12). This corresponds to a case where a person is photographed against the sun and the person occupies a large area in the imaged field, relative to the background. In such a case, the photographer usually considers the luminance scale of the person to be more preferential, a luminance scale characteristic adapted to the facial field is used.

When the target exposure amount I is smaller than the predetermined threshold c2 (S5), the exposure controller 12 calculates an exposure control value on the basis of the target exposure threshold c2, and sets the exposure control value into the iris controller 18, the shutter controller 20 and the AGC controller 17. On the other hand, the gamma compensation controller 22 specifies a luminance scale characteristic in accordance with the target exposure amount I and the area S of the facial field, and the gamma compensator 7 performs the gamma compensation for the digital image signal on the basis of the specified luminance scale characteristic (S13). This corresponds to, for example, a case where a person is photographed in the dark background under an intense spot light. In such a case, it is necessary to perform compensation such that the luminance of the facial field is lowered to a great extent. In this case, if compensation is performed only through the control of the exposure control value R, it is possible that the background is underexposure. For this reason, the exposure control value R is fixed to the value (i.e. minimum exposure control value r2) which prevent the background from being underexposure. And, the amount of luminance, which cannot be compensated with exposure control alone, can be compensated by varying the luminance scale characteristic through the control of gamma compensation. In this way, the luminance scale of the background can be maintained while the luminance of the facial field is kept at a proper level. Further, a more proper luminance scale characteristic can be set if control in accordance with the area of the facial field is simultaneously performed at the time of setting luminance scale characteristic, as described below.

First, when the area S of the facial field is smaller than the predetermined threshold k (S15), the gamma compensation controller 22 specifies a luminance scale characteristic as represented by the curve L3 which approximates the luminance scale characteristic in the normal case (S16). This corresponds to a case where a person is photographed under a spot light in the dark background. In such a case where the background occupies a large area in the imaged field, relative to the person as an object, the photographer is usually considered to prioritize the luminance scale of the background, but if a luminance scale characteristic adapted to the facial field is used, the background may be underexposure. In order to prevent such underexposure, the luminance scale characteristic approximating that in the normal case is used.

Then, when the area S of the facial field is greater than the threshold k but smaller than the threshold m (S17), the gamma compensation controller 22 specifies the luminance scale characteristic represented by the curve L6 which indicates that intermediate scales are slightly narrowed (S11). This corresponds to a case where a person is photographed under a spot light in the dark background and the background occupies half the area of the imaged field, relative to the person. In this case, it is desired to preserve the luminance scales of both the person and the background. Hence, a luminance scale characteristic corresponding to the case where the luminance scale of the facial field is taken into greater consideration than in the previous cases, must be used to produce the facial field with lower luminance so that overexposure can be prevented. However, the luminance scale of the facial field should not be so much lowered that the background may be underexposure.

When the area S of the facial field is greater than the threshold m (S17), the gamma compensation controller 22 specifies the luminance scale characteristic represented by the curve L7 which indicates that intermediate scales are considerably narrowed (S12). This corresponds to a case where a person is photographed under a spot light and the person occupies a large area in the imaged field, relative to the background. In such a case, since the photographer is usually considered to prioritize the luminance scale of the person, a luminance scale characteristic is used which corresponds to the case where the luminance of the facial field is lowered so that overexposure can be completely suppressed.

It should be noted here that the criterion value c1 for target exposure is preset as a value which does not destroy the luminance scales of the digital image signals inputted to the picture processing circuit 6 and having relatively higher luminance. It should also be noted that the criterion value c2 for target exposure is preset as a value which does not destroy the luminance scales of the digital image signals inputted to the picture processing circuit 6 and having relatively lower luminance. These criterion values c1 and c2 are preset in cameras when they are manufactured. However, they may also be manually set in the cameras by users, if they desire, after they are purchased. For example, the degree of controlling the exposure of the facial field may be varied on the display screen provided in a camera. If choice is made of using the high degree of control over the exposure of the facial field, the criterion value c1 is increased while the criterion value c2 is decreased. In this case, the exposure control value can be dynamically chosen within a wide range of target exposure amounts on the basis of the result of measurement of the luminance in the facial field. On the contrary, if choice is made of using the low degree of control over the exposure of the facial field, the criterion value c1 is decreased while the criterion value c2 is increased. In this case, the exposure control value can be dynamically chosen within a narrow range of target exposure amounts on the basis of the result of measurement of the luminance in the facial field.

The predetermine threshold k, which is used to evaluate the area of the facial field, is the threshold adapted to the case where the ratio of the facial field to the entire imaging area is very small and therefore almost all the imaging area is covered by the background, whereas the predetermined threshold m is that which is adapted to the case where the upper body of a person is photographed. These thresholds k and m are usually preset in cameras when they are manufactured. However, they may also be manually set in the cameras by users, as they desire. For example, the degree of evaluating the area of the facial field may be varied on the display screen provided in a camera. If choice is made of using the high degree of evaluating the area of the facial field, the thresholds k and m are decreased and the variation of the luminance scale characteristic in accordance with the area of the facial field is increased. On the contrary, if choice is made of using the low degree of evaluating the area of the facial field, the thresholds k and m are increased and the variation of the luminance scale characteristic in accordance with the area of the facial field is decreased.

The gamma controller can be so designed as to control not only luminance scale characteristic but also chrominance scale characteristic. If only the compensation of luminance scale is changed, the composition ratio of luminance to chrominance is sometimes adversely affected so that the color of the photographed picture can be pale or deep. By simultaneously changing the compensations of luminance and chrominance scale characteristics, the color of the photographed picture can be properly preserved.

Further, noise elimination processing, signal enhance processing, color difference signal processing, etc. may be adaptively changed in accordance with the result of measurement performed by the photometer and the luminance scale characteristics specified by the gamma compensation controller 22. The change in luminance scale characteristic sometimes changes the way noise is generated. Pictures of higher quality can be obtained by using adaptive processing, e.g. by intensifying the signal enhance processing when noise is decreased due to the change in luminance scale characteristic, or by intensifying the noise elimination processing when noise is increased due to the change in luminance scale characteristic.

Although the above embodiment is described as applied to the detection of the face of a person, the same configuration and operations as in the embodiment can equally be applied to the detection of any object other than a face. In such a case, a multitude of objects can be enumerated, but detailed description regarding those objects is omitted.

This invention will be by no means limited to the embodiment described above, but various variations and modifications will also be possible. For example, the above described embodiment is only for the facility of understanding this invention and therefore this invention is in no way limited to what include every component mentioned in the specification. Moreover, part of the embodiment described above can be eliminated or replaced by equivalent part.

Furthermore, part or all of the embodiment configuration described above can be realized with hardware or software executed by a processor. In addition, regarding the control lines and data lines, only those which are necessary for description are shown in the attached drawings and those which are not necessary for description are omitted. In reality, all the constituents shown in FIG. 1 may be considered as connected with one another.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An imaging apparatus equipped with a gamma compensator for performing gamma compensation for the imaged picture, comprising
    an imaging means for inputting picture data corresponding to a person as a photogenic subject;
    a face detecting means for detecting a facial field from the inputted picture data;
    a photometric means for exposure metering value of the facial field detected by the face detecting means;
    an exposure controlling means for calculating a target exposure amount on the basis of the exposure metering value of the facial field performed by the photometric means and for calculating an exposure control value on the basis of the calculated target exposure amount; and
    a gamma compensation controlling means for determining a luminance scale characteristic in accordance with the calculated target exposure amount, wherein the gamma compensator performs gamma compensation for the inputted picture by using the luminance scale characteristic determined by the gamma compensation controlling means.

2. An imaging apparatus as claimed in claim 1, further comprising a memory means for storing data necessary for picture processing, wherein the memory means stores two renewable criterion values for target exposure amount and two exposure control thresholds.

3. An imaging apparatus as claimed in claim 2, wherein the gamma compensation controlling means differentiates the luminance scale characteristic corresponding to the target exposure amount that falls within the range between the two renewable criterion values, from the luminance scale characteristic corresponding to the target exposure amount that lies above or below the range.

4. An imaging apparatus as claimed in claim 1, wherein the face detecting means includes a facial field area calculating means for calculating the area of the detected facial field.

5. An imaging apparatus as claimed in claim 4, wherein the gamma compensation controlling means specifies the luminance scale characteristic in accordance with the area of the facial field, which is calculated by the facial field area calculating means.

6. An imaging apparatus comprising
    an imaging means for imaging a photogenic subject and outputting a picture data;
    a detecting means for detecting a particular object from the picture data outputted from the imaging means;
    an exposure controlling means for performing exposure control over the imaging means within a range determined by predetermined criterion values, by using the picture data corresponding to the particular object detected by the detecting means;
    a gamma compensating means for performing gamma compensation for the picture data outputted from the imaging means; and
    a control means for performing control such that the luminance scale characteristic resulting from the gamma compensation performed by the gamma compensating means in the case where the exposure controlling means performs exposure control depending on the criterion values, is differentiated from the luminance scale characteristic resulting from the gamma compensation performed by the gamma compensating means in the case where the exposure controlling means performs exposure control within the range.

7. An imaging apparatus as claimed in claim 6, wherein the detecting means includes a particular object area calculating means for calculating the ratio of the area of the particular object to the area the entire imaging field, and the control means performs control in such a manner that when the exposure controlling means performs exposure control depending on the predetermined criterion values, the luminance scale characteristic resulting from the gamma compensation performed by the gamma compensating means is varied in accordance with the area ratio calculated by the particular object area calculating means.

* * * * *